United States Patent
Pricochi et al.

(10) Patent No.: US 11,854,265 B2
(45) Date of Patent: *Dec. 26, 2023

(54) SYSTEM AND METHOD FOR DETECTING SCAN IRREGULARITIES AT SELF-CHECKOUT TERMINALS

(71) Applicant: Everseen Limited, Blackpool (IE)

(72) Inventors: Andrei Pricochi, Timisoara Timis (RO); Ciprian David, Timisoara (RO); Cosmin Cernazanu-Glavan, Timisoara (RO); Dan Alexandru Pescaru, Timisoara (RO)

(73) Assignee: Everseen Limited, Blackpool (IE)

( * ) Notice: Subject to any disclaimer, the term of this patent is extended or adjusted under 35 U.S.C. 154(b) by 418 days.

This patent is subject to a terminal disclaimer.

(21) Appl. No.: 17/376,931

(22) Filed: Jul. 15, 2021

(65) Prior Publication Data

US 2021/0357658 A1    Nov. 18, 2021

Related U.S. Application Data

(63) Continuation of application No. 16/254,760, filed on Jan. 23, 2019, now Pat. No. 11,100,331.

(51) Int. Cl.
*G06V 20/52* (2022.01)
*G06V 20/40* (2022.01)
(Continued)

(52) U.S. Cl.
CPC .............. *G06V 20/52* (2022.01); *G06V 20/46* (2022.01); *G06V 40/107* (2022.01); *G06V 40/28* (2022.01); *G06V 20/44* (2022.01)

(58) Field of Classification Search
None
See application file for complete search history.

(56) References Cited

U.S. PATENT DOCUMENTS 5,883,968 A  *  3/1999  Welch .................... G07G 3/003
                                                    382/168
6,236,736 B1    5/2001  Crabtree et al.
(Continued)

FOREIGN PATENT DOCUMENTS

EP    3211891 A1    8/2017

OTHER PUBLICATIONS

StopLift Checkout Vision Systems https://www.stoplift.com/technology/computer-vision/.
(Continued)

*Primary Examiner* — Samah A Beg
(74) *Attorney, Agent, or Firm* — Young Basile Hanlon & MacFarlane, P.C.

(57) ABSTRACT

A system for detecting a scan irregularity in scanning process during check-out at a retail store, includes an image receiving module for receiving a video stream of a scanning zone, an image processing module for detecting visual scan intervals in image frames of the video stream, and a decision module. The decision module is configured to process each detected visual scan interval, wherein a processed visual scan interval includes a valid scan action, wherein the valid scan action is a user action performed for scanning an item. The decision module is further configured to detect a scan irregularity in the check-out process, wherein the scan irregularity occurs when an item identified for scanning in a processed visual scan interval is absent in a list of scanned items generated by the scanner during corresponding interval, and provide an alert regarding the scan irregularity at a user computing device.

18 Claims, 3 Drawing Sheets

(51) Int. Cl.
*G06V 40/20* (2022.01)
*G06V 40/10* (2022.01)

(56) References Cited

U.S. PATENT DOCUMENTS

| | | | |
|---|---|---|---|
| 8,448,858 B1 * | 5/2013 | Kundu | G07G 3/003 |
| | | | 235/383 |
| 8,448,859 B2 | 5/2013 | Goncalves et al. | |
| 8,462,212 B1 | 6/2013 | Kundu et al. | |
| 8,570,375 B1 * | 10/2013 | Srinivasan | H04N 7/181 |
| | | | 235/383 |
| 9,202,117 B2 | 12/2015 | Kundu et al. | |
| 2006/0243798 A1 | 11/2006 | Kundu et al. | |
| 2007/0057049 A9 | 3/2007 | Kundu et al. | |
| 2009/0324100 A1 | 12/2009 | Kletter et al. | |
| 2010/0059589 A1 | 3/2010 | Goncalves et al. | |
| 2010/0329509 A1 | 12/2010 | Fahn et al. | |
| 2013/0250115 A1 | 9/2013 | Fan et al. | |
| 2014/0211991 A1 | 7/2014 | Stoppa et al. | |
| 2014/0347479 A1 | 11/2014 | Givon | |
| 2015/0221191 A1 | 8/2015 | Doyle et al. | |
| 2016/0283602 A1 * | 9/2016 | Charpentier | G06Q 30/06 |
| 2018/0165733 A1 | 6/2018 | Kundu et al. | |
| 2019/0294314 A1 * | 9/2019 | Tada | G06V 20/20 |
| 2020/0175440 A1 * | 6/2020 | Doyle | G06Q 20/208 |
| 2020/0210652 A1 * | 7/2020 | Guess | G06K 7/1473 |
| 2020/0401793 A1 * | 12/2020 | Leung | G06V 10/147 |

OTHER PUBLICATIONS

International search report issued in corresponding international application No. PCT/IB2019/058912 dated Jan. 17, 2020.

* cited by examiner

SYSTEM AND METHOD FOR DETECTING SCAN IRREGULARITIES AT SELF-CHECKOUT TERMINALS

CROSS-REFERENCE TO RELATED APPLICATION(S)

This application is a continuation of U.S. application Ser. No. 16/254,760, filed Jan. 23, 2019, the entire disclosure of which is hereby incorporated by reference.

TECHNICAL FIELD

The present disclosure relates generally to self-checkout terminals in a retail store, and more specifically, to systems to generate an alert if there is a scan irregularity in visual scan detection.

BACKGROUND

Self-checkout machines provide a mechanism for customers to process their own purchases from a retailer. They are an alternative to the traditional cashier-staffed checkout. The customer performs the job of the cashier themselves, by scanning and applying payment for the items. In a typical self-checkout system, the customer is required to scan each item against a scanner, and then do the requisite payment.

However, a customer may have little or no training in the operation of a self-service checkout terminal, and may make errors when checking out their items. The customer may unintentionally miss out some items while scanning, and may move out of the store without making requisite payment. Further, shop-lifting is a major disadvantage associated with self-checkout stores. For example, a customer may not scan some items intentionally, and put the unscanned items in their shopping cart, and may move out of the store without making full payment. As a result, the self-check out stores may incur huge losses. Therefore, the current self-check out stores may still require a high number of personnel or store operators for preventing theft and unauthorized picking-up of items.

Therefore, in light of the foregoing discussion, there exists a need for a method and a system that detects scan irregularities in a self-checkout stores, that generates an alert when there is a mismatch between the products present in a shopping basket of the user, and a scanned list of items generated by the scanner, and that overcomes the aforementioned drawbacks associated with existing self-checkout systems.

SUMMARY

According to a first aspect of the present disclosure, there is provided a system for detecting a scan irregularity in scanning of one or more items by a user, during a check-out process at a retail store. The system may include an image receiving module configured to receive a video stream of a scanning zone in real-time from at least one video camera, wherein the scanning zone is a region in a field of view of a scanner of the retail store. The system may further include an image processing module configured to process each image frame of the video stream for detecting one or more visual scan intervals in one or more image frames, wherein the visual scan interval is a time interval during which an item is identified in the scanning zone for scanning by the scanner. The system may further include a decision module configured to process each detected visual scan interval based on a set of pre-defined rules, wherein a processed visual scan interval includes a valid scan action, wherein the valid scan action is a user action performed for scanning an item, detect a scan irregularity in the check-out process, wherein the scan irregularity occurs when an item identified for scanning in a processed visual scan interval is absent in a list of scanned items generated by the scanner during corresponding interval, and provide an alert regarding the scan irregularity at a user computing device.

According to a second aspect of the present disclosure, there is provided a method for detecting a scan irregularity in scanning of one or more items by a user, during check-out process at a retail store. The method may include receiving a video stream of a scanning zone in real-time from at least one video camera, wherein the scanning zone is a region in a field of view of a scanner of the retail store. The method may further include processing each image frame of the video stream for detecting one or more visual scan intervals in one or more image frames, wherein the visual scan interval is a time interval during which an item is identified in the scanning zone for scanning by the scanner. The method may further include processing each detected visual scan interval based on a set of pre-defined rules, wherein a processed visual scan interval includes a valid scan action, wherein the valid scan action is a user action performed for scanning an item. The method may further include detecting a scan irregularity in the check-out process, wherein the scan irregularity occurs when an item identified for scanning in a processed visual scan interval is absent in a list of scanned items generated by the scanner during corresponding interval. The method may further include providing an alert regarding the scan irregularity at a user computing device.

According to a third aspect of the present disclosure, there is provided a computer programmable product for detecting a scan irregularity in scanning of one or more items by a user, during check-out process at a retail store. The computer programmable product includes a set of instructions, the set of instructions when executed by a processor causes the processor to receive a video stream of a scanning zone in real-time from at least one video camera, wherein the scanning zone is a region in a field of view of a scanner of the retail store, process each image frame of the video stream for detecting one or more visual scan intervals in one or more image frames, wherein the visual scan interval is a time interval during which an item is identified in the scanning zone for scanning by the scanner, process each detected visual scan interval based on a set of pre-defined rules, wherein a processed visual scan interval includes a valid scan action, wherein the valid scan action is a user action performed for scanning an item, detect a scan irregularity in the check-out process, wherein the scan irregularity occurs when an item identified for scanning in a processed visual scan interval is absent in a list of scanned items generated by the scanner during corresponding interval, and provide an alert regarding the scan irregularity at a user computing device.

Various embodiments of the present disclosure provide a system and method that detects scan irregularities in a self-checkout stores, that generate an alert when there is a mismatch between the products present in a shopping basket of the user, and a scanned list of items generated by the scanner.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
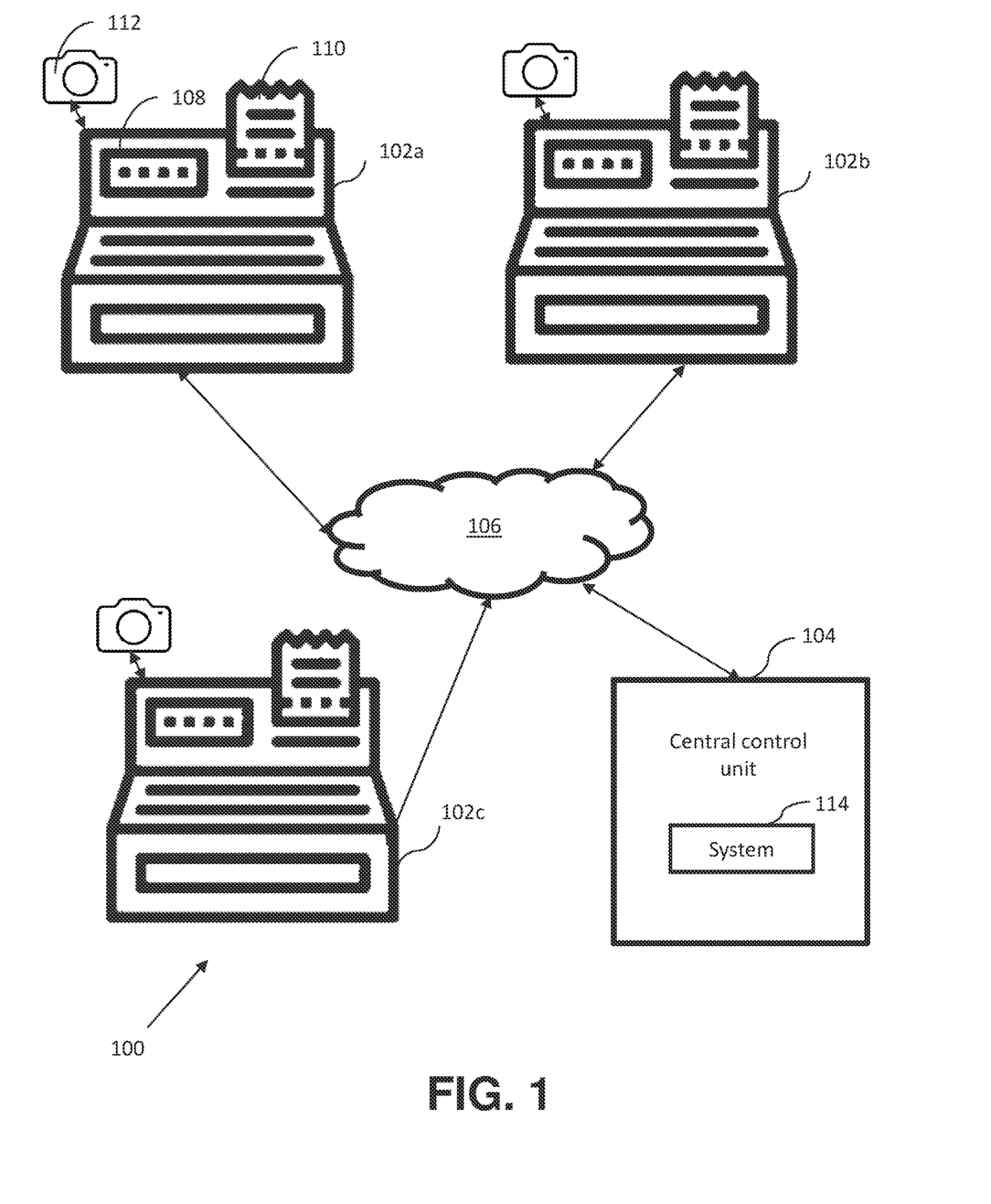
FIG. 1 illustrates a retail environment, wherein various embodiments of the present disclosure can be practiced.

Referring to FIG. 1, there is shown a retail environment 100, wherein various embodiments of the present disclosure can be practiced. The retail environment 100 includes first through third self-checkout terminals 102a to 102c (hereinafter collectively referred to as self-checkout terminals 102), and a central control unit 104, communicatively coupled to each other through a communication network 106.

The communication network 106 may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof. In an example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

Each self-checkout terminal 102a to 102c, for example, the first check-out terminal 102a is equipped with a first scanner 108 for enabling a user to scan one or more items themselves, and a first user display 110 for enabling a user to make requisite selection and payment of one or more items. In an example, the first scanner 108 may be a bar code scanner for scanning bar code of an item, for identifying the item thereof. Preferably, the first scanner 108 is a stationary wall or table-mounted scanner, designed for check-out counters of supermarkets, and other retail stores, for scanning items placed in a scanning zone. In the context of the present disclosure, the scanning zone is an area in front of the first scanner 108 where the user brings up the items for scanning for the purpose of buying of those items.

Further, each self-checkout terminal 102a to 102c may be surrounded by one or more overhead video cameras for capturing scanning zone of each self-checkout terminal 102a to 102c, for example, the first self-checkout terminal 102a is surrounded by a first video camera 112. The first video camera 112 is configured to continuously capture a video of the scanning zone, in order to facilitate detection of a scan irregularity due to a mismatch in the items brought up for scanning by the user, and the actual items scanned by the first scanner 108.

The first user display 110 may be a touch-based display configured to receive and display one or more instructions. Few examples may include, but are not limited to, Liquid Crystal Displays (LCD) devices, Light Emitting Diode (LED)-based displays, Organic LED (OLED)-based displays devices, and micro OLED-based display devices.

In an example, the first check-out terminal 102a includes a processor (not shown) communicatively coupled to the first scanner 108 and the first user display 110, for recording scanning of one or more items by the first scanner 108, and providing instructions on the first user display 110 for payment of one or more scanned items. Throughout the present disclosure, the term 'processor' relates to a computational element that is operable to respond to and processes instructions that drive respective self-checkout terminal 102a to 102c. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated thereof.

Each of the second and third check-out terminals 102b and 102c are similar to the first check-out terminal 102a in terms of construction and functionality, therefore, they have not been explained herein again for the sake of brevity.

The central control unit 104 is communicatively coupled to each self-checkout terminal 102a to 102c for controlling and managing their operations thereof. In an embodiment of the present disclosure, the scanners of each self-checkout terminal 102a to 102c are communicatively coupled to the central control unit 104 to record the scanned content in a memory of the central control unit 104, for further processing. Further, in another embodiment of the present disclosure, the video cameras present in the retail store environment 100 are communicatively coupled to the central control unit 104.

The central control unit 104 may include a system 114 for detecting a mismatch in the items brought up for scanning in the scanning zone, and the actual items scanned by corresponding scanner in the retail environment 100. Throughout the present disclosure, the term 'system 114 relates to a structure and/or module that include programmable and/or non-programmable components configured to store, process and/or share information. Optionally, the system 114 includes any arrangement of physical or virtual computational entities capable of enhancing information to perform various computational tasks. In an example, the system 114 may include components such as memory, a processor, a network adapter and the like, to store, process and/or share information with other computing components.

Figure 2:
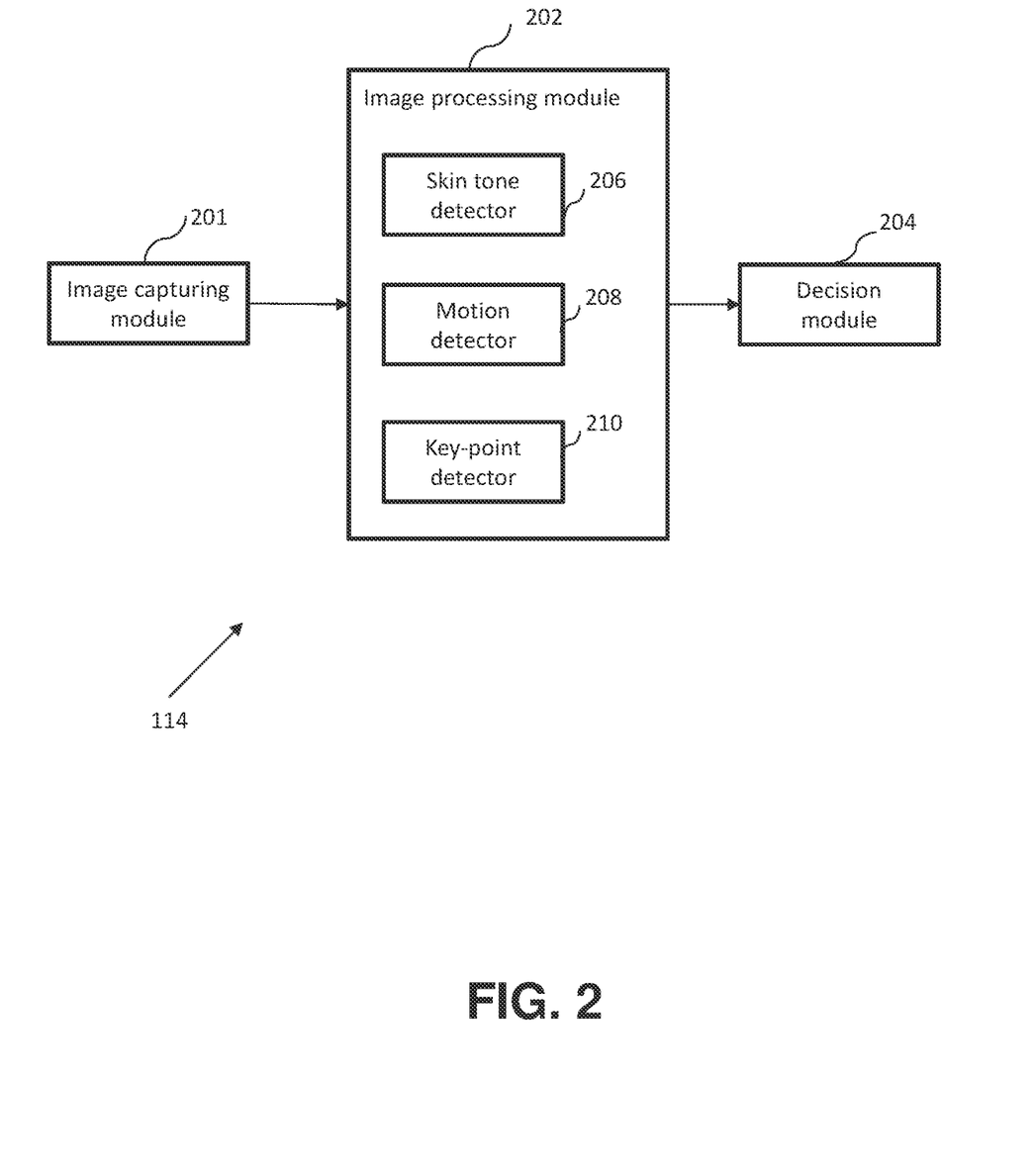
FIG. 2 illustrates a system for generating an alert when there is a scan irregularity in visual scan detection in the retail environment, in accordance with an embodiment of the present disclosure.

FIG. 2 illustrates the system 114 for generating an alert when there is a scan irregularity in visual scan detection in the retail environment 100, in accordance with an embodiment of the present disclosure. In the context of the present disclosure, "the scan irregularity" takes place, when there is a mismatch between items brought for scanning in a scanning zone by a user, and a list of scanned items generated by corresponding scanner. The system 114 may be implemented at the control unit 104, or at each self-check out terminal 102, or at both.

The system 114 includes an image receiving module 201 for receiving images captured by one or more video cameras of the retail environment 100, an image processing module 202 for processing the captured images to detect visual scan intervals, and a decision module 204 for detecting valid scan intervals, and generating an alert in the event of a mismatch between item brought up for scanning, and actual items scanned by corresponding scanner of the retail environment 100.

Referring back to FIG. 1, the 'scan action' is referred to as a user action when the user brings up the item for scanning in the scanning zone of the first scanner 108, but it may or may not be successfully scanned by the first scanner 108. In an example, a user may bring up an item in the scanning zone of the first scanner 108, but the user may hold the item in such a way that the bar code of the item may not be visible to the bar code scanner 108. In such case, the user may put the item in their shopping bag after performing the scan action, but in reality, it may not be scanned by the first scanner 108, and the user may not receive a bill for that item. Therefore, detection of scan actions in image frames captured by the video cameras, are crucial in determining one or more scan irregularities in the items scanned by scanners in the retail environment 100.

Referring again to FIG. 2, the image processing module 202 includes one or more feature extraction modules that are used to extract features from a current image frame received by the image receiving module 201, that indicate the occurrence of the scan action within the current image frame. The features may be designed in accordance with the action to be detected. In the context of the present disclosure, the image processing module 202 includes a skin tone detector 206, a motion detector 208, and a key-point detector 210.

The skin tone detector 206 is configured to extract the percentage of skin pixels in the current image frame relative to the previous image frame with the intention to determine if there is a hand involved in a scan action. In the context of the present disclosure, an image pixel is labelled as a skin pixel if the image pixel is found to have a color similar to the color of human skin. While scanning a product, usually the hand of the customer in present in the scanning zone, so an increase in percentage of skin pixels in the current image frame may indicate a scan action. The skin tone detector 206 receives a current image frame as an input, and generates a binary map indicating whether skin tone is being detected or not in the current image frame. In an embodiment of the present disclosure, the skin pixel percentage with respect to the foreground pixels have to be smaller than a pre-defined skin pixel threshold value in each image frame. This is done in order to limit the false positives due to the passage of empty hands in the scanning area.

The motion detector 208 is configured to extract the percentage of motion pixels in the current image frame relative to the previous image frame with the intention to determine if there is motion involved in a scan action. In the context of the present disclosure, a current image pixel is labelled as a motion pixel if a motion has been detected in the current image pixel with respect to a previous image pixel. While scanning a product, usually the hand of the customer moves in the scanning zone, so a detected motion in the video frame, can indicate a scan action. In an embodiment of the present disclosure, the motion detector 204 receives a current image frame as an input, and generates a binary map indicating whether motion is being detected or not in the current image frame.

The key-point detector 210 is configured to indicate the presence of an object in the scanning zone. While scanning a product, usually when a new object enters into the scanning zone, the number of key-points would increase due to the new geometrical form (the product) that is present in the scene, and due to the textures that cover the product and which can create new corner points. In an embodiment of the present disclosure, the key-point detector 208 receives a current image frame as an input and generates a set of key-points as an output. Usually, a high number of key-points is associated with a scan action. A threshold on the temporal evolution of the number of key-points present in the scanning zone provides an estimate of a visual scan interval. In the context of the present disclosure, the visual scan interval of a product is the time interval when the product was present in the scanning zone. In an example, if the product was present from 10:00 am to 10:00:02 am in the scanning zone, then the visual scan interval of the product is 2 seconds.

The system 114 further includes a decision module 204 that is configured to decide if a detected visual scan interval is valid, i.e. it includes a scan action or not. The decision module 204 is further configured to determine whether the detected visual scan interval includes a scan action or not, based on one or more pre-defined rules, in order to regularize the detected scan intervals, cope with certain synchronization delays, and prevent eventual misclassifications.

According to a first pre-defined rule, the decision module 204 is configured to set a pre-defined range of scan interval, and discard the visual scan intervals that are too small with respect to the pre-defined threshold size, or are too big with respect to the pre-defined threshold size. In an embodiment of the present disclosure, the pre-defined threshold size may correspond to a normal speed of the human hand.

According to a second pre-defined rule, the decision module 204 is configured to set a pre-defined threshold first distance between consecutive visual scan intervals, and merge the visual scan intervals that are close with respect to the pre-defined threshold first distance. In an example, if the pre-defined threshold distance is two seconds, and the first visual scan interval is from 10:00 am to 10:00:02 am, and second visual scan interval is from 10:00:03 am to 10:00:04 am, then both the visual scan intervals may be combined, and a combined visual scan interval is formed from 10:00 am to 10:00:04 am. According to a third pre-defined rule, the decision module 204 is configured to keep an item from the scanned product list at a certain distance from the scan interval, in order to cope with synchronization delays between the scanner and the video camera. The distance is the time between the border of a visual scan interval and the moment given by the timestamp of the scanned item. The decision module 204 is configured to correct small desynchronizations that are smaller than the pause between two consecutive scans. It may happen sometimes, that the due to high latency of the network, the information about the scanned items may be delayed. In an example, the item may be actually scanned at 10:02 am but due to high latency, the timestamp of scanning of the item may be recorded as 10:03 am. So, the decision module 204 takes into consideration of this small delay to validate/invalidate a detected visual scan interval, so as to maintain synchronization between the scanner and camera.

According to a fourth pre-defined rule, the decision module 204 is configured to validate/invalidate a detected visual scan interval based on computation of a corresponding glass motion coverage. In the context of the present disclosure, the glass motion coverage is a ratio between a number of frames depicting the glass area of the scanning zone, and the number of frames having a foreground other than the glass area, in the scanning zone. The glass area is that area in the scanning zone that contains a glass that covers the scanner. The number of frames for which the glass motion coverage is computed could be around 10 frames for 25 fps video stream. This is done so as to eliminate false positives due to passage of objects in the scanning zone, but without scanning intention. It is possible to have motion in the scanning zone, but outside the glass area (for example, head passing over some part of the scanner area).

According to a fifth pre-defined rule, the decision module 204 is configured to validate/invalidate a detected visual scan interval based on the percentage of skin pixels with respect to the foreground pixels. The decision module 204 may detect absence of a visual scan in a visual scan interval, when the percentage of skin pixels is larger than a pre-defined skin pixel threshold value, as it indicates the presence of empty hands in the scanning zone. Also, it may indicate that the customer has operated the scanning zone without the intention of scanning. Thus, the decision module 204 invalidates corresponding visual scan interval, and does not use it for determining scan irregularity in visual scan detection According to a sixth pre-defined rule, the decision module 204 is configured to invalidate a detected visual scan interval if an increase in corresponding number of key-points is less than a key-point threshold value, as it indicates increase in number of key-points due to noise, and noise related mis-detections. The decision module 204 invalidates corresponding visual scan interval, and does not use it for determining scan irregularity in visual scan detection.

The decision module 204 is configured to detect scan irregularity for each validated visual scan interval, and generate an alert when the scan irregularity is detected. For example, the decision module 204 compares an item of a validated visual scan interval with a list of scanned items generated for that interval. If the item of the validated visual scan interval is not found in the list of items scanned by the scanner in that interval, then the decision module 204 implies that there has been an scan irregularity in visual scan detection. In an example, if the video camera detects that the product was present from 10:00 am to 10:00:02 am in the scanning zone, however it is not present in the list of items scanned by the scanner from 10:00 am to 10:00:02 am, then the decision module 204 infers that there is a scan irregularity in visual scan detection of the product. The decision module 204 is then configured to generate an alert. The alert may be sent as an instant message or as email, or as a short message service, on the user computing devices, or at the display of corresponding self-checkout terminals.

Figure 3:
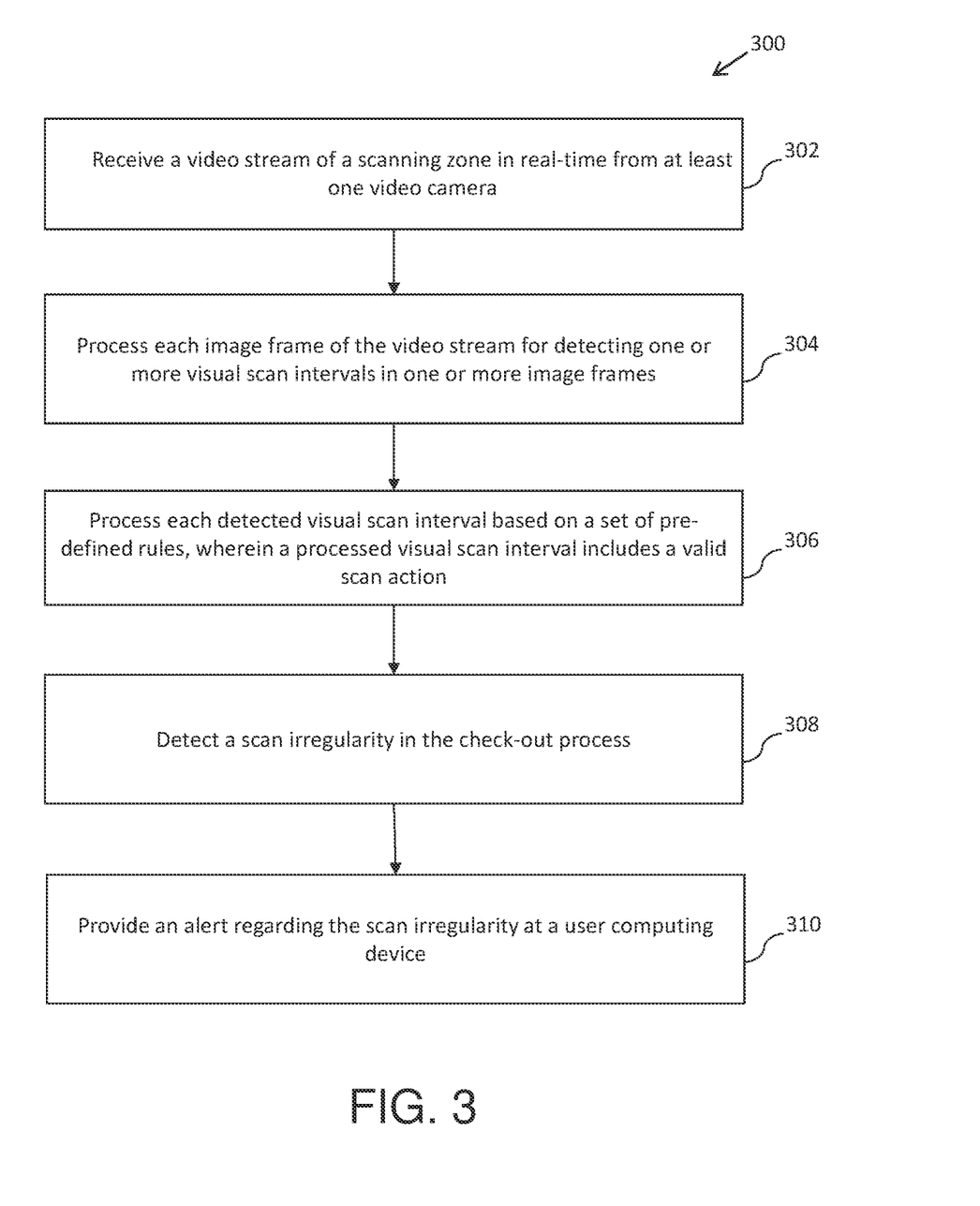
FIG. 3 is a flowchart illustrating a method for generating an alert when there is a scan irregularity in visual scan detection in the retail environment, in accordance with an embodiment of the present disclosure.

FIG. 3 is a flowchart illustrating a method 300 for generating an alert when there is a scan irregularity in visual scan detection in the retail environment 100, in accordance with an embodiment of the present disclosure. The order in which the method 300 is described is not intended to be construed as a limitation, and any number of the described method blocks can be combined in any appropriate order to carry out the method 300 or an alternative method. Additionally, individual blocks may be deleted from the method 300 without departing from the scope of the subject matter described herein.

At step 302, a video stream of a scanning zone in real-time is received from at least one video camera, wherein the scanning zone is a region in a field of view of a scanner of the retail store. At step 304, each image frame of the video stream is processed for detecting one or more visual scan intervals in one or more image frames, wherein the visual scan interval is a time interval during which an item is identified in the scanning zone for scanning by the scanner. In an embodiment of the present disclosure, the image processing includes detecting a scan action in a current image frame based on presence of a human hand in the current image frame, wherein the presence of a human hand is detected based on a percentage of skin pixels in the current image frame relative to a previous image frame. The image processing further includes detecting a scan action in the current image frame based on a movement of the human hand in the current image frame, wherein the motion is detected based on a percentage of motion pixels in the current image frame relative to the previous image frame. The image processing further includes detecting a scan action in the current image frame based on presence of an object in the human hand in the current image frame, wherein the presence of the object is determined based on a number of key-points in the scanning zone, wherein the key-point detector detects a visual scan interval for the current image frame, if a scan action is found in the current image frame.

At step 306, each detected visual scan interval is processed based on a set of pre-defined rules, wherein a processed visual scan interval includes a valid scan action, wherein the valid scan action is a user action performed for scanning an item.

According to a first pre-defined rule, a pre-defined range of a visual scan interval is set, wherein the detected visual scan interval is invalidated that is outside the pre-defined range of the visual scan interval. According to a second pre-defined rule, a pre-defined threshold distance is set, wherein the two consecutive visual scan intervals are merged, if a distance between the two consecutive visual scan intervals is less than the pre-defined threshold distance. According to a third pre-defined rule, a synchronization delay between the video camera and the scanner is taken into account, while processing a visual scan interval. According to a fourth pre-defined rule, a detected visual scan interval is validated based on computation of a glass motion coverage in one or more corresponding image frames. According to a fifth pre-defined rule, a detected visual scan interval is validated based on a percentage of skin pixels with respect to foreground pixels in corresponding image frames. According to a sixth pre-defined rule, a detected visual scan interval is invalidated if a number of key-points in corresponding image frames is less than a key-point threshold value.

At step 308, a scan irregularity is detected in the checkout process, wherein the scan irregularity occurs when an item identified for scanning in a processed visual scan interval is absent in a list of scanned items generated by the scanner during corresponding interval. In an example, a user may bring up an item in the scanning zone of the scanner, but the user may hold the item in such a way that the bar code of the item may not be visible to the bar code scanner. In such case, the user may put the item in their shopping bag after performing the scan action, but in reality, it may not be scanned by the scanner, and the user may not receive a bill for that item. This leads to scan irregularity.

At step 310, an alert is provided regarding the scan irregularity at a user computing device. The alert may be sent as an instant message or as email, or as a short message service, on the user computing devices, or at the display of corresponding self-checkout terminals.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A retail store with a self-check-out process for one or more items, the retail store comprising:
   a self-checkout terminal comprising:
      a scanner configured for use in operably scanning an item when presented within a field of view of the scanner; and
      at least one video camera configured to capture a video stream of a scanning zone in real-time, wherein the scanning zone is representative of the field of view of the scanner; and
   a system communicably coupled to the scanner and the at least one video camera, the system configured to detect a scan irregularity in the scanning of the one or more items by a user using the scanner, the system comprising:
      an image receiving module configured to receive the video stream of the scanning zone in real-time from the at least one video camera;
      an image processing module configured to process each image frame of the video stream for detecting one or more visual scan intervals in one or more image frames, wherein each detected visual scan interval is a series of image frames in a time interval of the received video stream during which an item is identified, in the series of image frames, in the scanning zone scanned by the scanner; and
      a decision module configured to:
         process each detected visual scan interval based on a set of pre-defined rules to generate a processed visual scan interval which includes a scan action and wherein the processed visual scan interval is generated based, at least, on a computed glass motion coverage of the one or more image frames of the visual scan interval;
         detect a scan irregularity in the self-check-out process when an item identified, for scanning in the processed visual scan interval, is absent from a list of items generated by the scanner during the corresponding time interval; and
         provide an alert regarding the scan irregularity on at least one of: a user computing device and a display of the self-checkout terminal.

2. The retail store of claim 1, wherein the image processing module comprises:
   a skin tone detector configured to detect a scan action in a current image frame based on a presence of a human hand in the current image frame, wherein the presence of a human hand is detected based on a percentage of skin pixels in the current image frame relative to a previous image frame;
   a motion detector configured to detect a scan action in the current image frame based on a movement of the human hand in the current image frame, wherein the movement is detected based on a percentage of motion pixels in the current image frame relative to the previous image frame; and
   a key-point detector configured to detect a scan action in the current image frame based on a presence of an object in the human hand in the current image frame, wherein the presence of the object is determined based on a number of key-points in the scanning zone, wherein a threshold on a temporal evolution of the number of key-points present in the scanning zone provides an estimate of a visual scan interval, and wherein the key-point detector detects a visual scan interval for the current image frame if a scan action is found in the current image frame.

3. The retail store of claim 1, wherein the decision module is configured to set a pre-defined range of a visual scan interval based on a first pre-defined rule, wherein the decision module invalidates a detected visual scan interval that is outside the pre-defined range of the visual scan interval.

4. The retail store of claim 1, wherein the decision module is configured to set a pre-defined threshold distance based on a second pre-defined rule, wherein the decision module merges two consecutive visual scan intervals if a distance between the two consecutive visual scan intervals is less than the pre-defined threshold distance.

5. The retail store of claim 1, wherein the decision module is configured to take into account of a synchronization delay between the video camera and the scanner based on a third pre-defined rule, while processing a visual scan interval.

6. The retail store of claim 1, wherein the computed glass motion coverage is a ratio between a number of frames depicting a glass area of the scanning zone and the number of frames having a foreground other than the glass area.

7. The retail store of claim 1, wherein the decision module is configured to validate a detected visual scan interval based on a percentage of skin pixels with respect to foreground pixels in corresponding image frames, based on a fifth pre-defined rule.

8. The retail store of claim 1, wherein the decision module is configured to invalidate a detected visual scan interval if a number of key-points in corresponding image frames is less than a key-point threshold value, based on a sixth pre-defined rule.

9. The retail store of claim 1, wherein the alert regarding the detected scan irregularity is provided in at least one of: an instant message, an e-mail, or a short messaging service (SMS) prompt.

10. A method of operating a retail store, the method comprising:
   providing a self-checkout terminal having a scanner, at least one video camera, and a system coupled in communication with the scanner and the at least one video camera for detecting a scan irregularity in a self-check-out process;

scanning an item when presented within a field of view of the scanner;

capturing a video stream of a scanning zone in real-time using the at least one video camera, wherein the scanning zone is representative of at least the field of view of the scanner; and receiving the video stream of the scanning zone in real-time from the at least one video camera by the system;

processing each image frame of the video stream for detecting one or more visual scan intervals in one or more image frames, wherein each detected visual scan interval is a series of image frames in a time interval of the received video stream during which an item is identified, in the series of image frames, in the scanning zone scanned by the scanner;

processing each detected visual scan interval based on a set of pre-defined rules to generate a processed visual scan interval which includes a scan action and wherein the processed visual scan interval is generated based, at least, on a computed glass motion coverage of the one or more image frames of the visual scan interval;

detecting a scan irregularity in the self-check-out process when an item identified, for scanning in the processed visual scan interval, is absent from a list of items generated by the scanner during the corresponding time interval; and providing an alert regarding the scan irregularity on at least one of: a user computing device and a display of the self-checkout terminal.

11. The method of claim 10, wherein the processing each image frame of the video stream comprises:

detecting a scan action in a current image frame based on a presence of a human hand in the current image frame, wherein the presence of a human hand is detected based on a percentage of skin pixels in the current image frame relative to a previous image frame;

detecting a scan action in the current image frame based on a movement of the human hand in the current image frame, wherein the movement is detected based on a percentage of motion pixels in the current image frame relative to the previous image frame; and detecting a scan action in the current image frame based on a presence of an object in the human hand in the current image frame, wherein the presence of the object is determined based on a number of key-points in the scanning zone, wherein a threshold on a temporal evolution of the number of key-points present in the scanning zone provides an estimate of a visual scan interval, and wherein a key-point detector detects a visual scan interval for the current image frame if a scan action is found in the current image frame.

12. The method of claim 10 further comprising setting a pre-defined range of the scan interval based on a first pre-defined rule, wherein a detected visual scan interval is invalidated, that is outside the pre-defined range of the scan interval.

13. The method of claim 10 further comprising setting a pre-defined threshold distance based on a second pre-defined rule for merging two consecutive visual scan intervals if a distance between the two consecutive visual scan intervals is less than the pre-defined threshold distance.

14. The method of claim 10 further comprising taking into account of a synchronization delay between the video camera and the scanner based on a third pre-defined rule, while processing a visual scan interval.

15. The method of claim 10, wherein the computed glass motion coverage is a ratio between a number of frames depicting a glass area of the scanning zone and the number of frames having a foreground other than the glass area.

16. The method of claim 10 further comprising validating a detected visual scan interval based on a percentage of skin pixels with respect to foreground pixels in corresponding image frames, based on a fifth pre-defined rule.

17. The method of claim 10 further comprising invalidating a detected visual scan interval if a number of key-points in corresponding image frames is less than a key-point threshold value, based on a sixth pre-defined rule.

18. The method of claim 10 further comprising providing the alert regarding the detected scan irregularity in at least one of: an instant message, an e-mail, or a short messaging service (SMS) prompt.

* * * * *